US010793815B2

(12) United States Patent
Güldenzopf

(10) Patent No.: US 10,793,815 B2
(45) Date of Patent: Oct. 6, 2020

(54) METHOD OF PRODUCING A FINISHED, AGED DISTILLED SPIRIT

(71) Applicant: James Joseph Sanctified Spirits, LLC, Westlake, TX (US)

(72) Inventor: Joseph Güldenzopf, Westlake, TX (US)

(73) Assignee: James Joseph Sanctified Spirits, LLC, Westlake, TX (US)

( * ) Notice: Subject to any disclaimer, the term of this patent is extended or adjusted under 35 U.S.C. 154(b) by 316 days.

(21) Appl. No.: 15/951,054

(22) Filed: Apr. 11, 2018

(65) Prior Publication Data

US 2019/0062679 A1 Feb. 28, 2019

Related U.S. Application Data

(60) Provisional application No. 62/549,329, filed on Aug. 23, 2017.

(51) Int. Cl.
*C12G 3/07* (2006.01)
*G09F 3/02* (2006.01)
*C12H 1/22* (2006.01)

(52) U.S. Cl.
CPC ............ *C12G 3/07* (2019.02); *C12H 1/22* (2013.01); *G09F 2003/0273* (2013.01)

(58) Field of Classification Search
CPC ...... C12G 3/07; C12H 1/22; G09F 2003/0273
See application file for complete search history.

(56) References Cited

U.S. PATENT DOCUMENTS

| 2,025,470 | A  | * | 12/1935 | Miller ................. | B65D 3/14 |
|           |    |   |         |                         | 229/5.5   |
| 7,357,069 | B1 |   | 4/2008  | Karasch et al.          |           |
| 2012/0088018 | A1 | * | 4/2012 | Lix ................... | B24C 1/04 |
|           |    |   |         |                         | 426/422   |
| 2013/0045300 | A1 | * | 2/2013 | Robillard ............ | C12H 1/22 |
|           |    |   |         |                         | 426/11    |
| 2015/0197715 | A1 | * | 7/2015 | Peniche .............. | C12G 3/07 |
|           |    |   |         |                         | 426/124   |
| 2016/0097023 | A1 | * | 4/2016 | Peniche .............. | C12G 3/07 |
|           |    |   |         |                         | 426/592   |
| 2018/0305649 | A1 | * | 10/2018 | Hall ................. | C12H 1/00 |

OTHER PUBLICATIONS

"Barrel Aged in a Bottle™"; Oak Infusion Spiral; American Oak Infusion Spiral® System; www.barrelagedinabottle.com; undated; 1 pg.

* cited by examiner

*Primary Examiner* — Ryan J. Walters

(57) ABSTRACT

The disclosure provide a method of producing a finished, aged distilled spirit, a method of producing bottles of a distilled spirit that employ in-bottle finishing, and an in-bottle finishing bottle of distilled spirit. In one embodiment, the method of producing a finished, aged distilled spirit includes: (1) placing an aged distilled spirit in a bottle, (2) placing a wood piece in the bottle, wherein the wood piece is used for in-bottle finishing of the aged distilled spirit, and (3) sealing the bottle, having located within the bottle both the aged distilled spirit and the wood piece.

18 Claims, 2 Drawing Sheets

METHOD OF PRODUCING A FINISHED, AGED DISTILLED SPIRIT

CROSS REFERENCE TO RELATED APPLICATION

Figure 1:
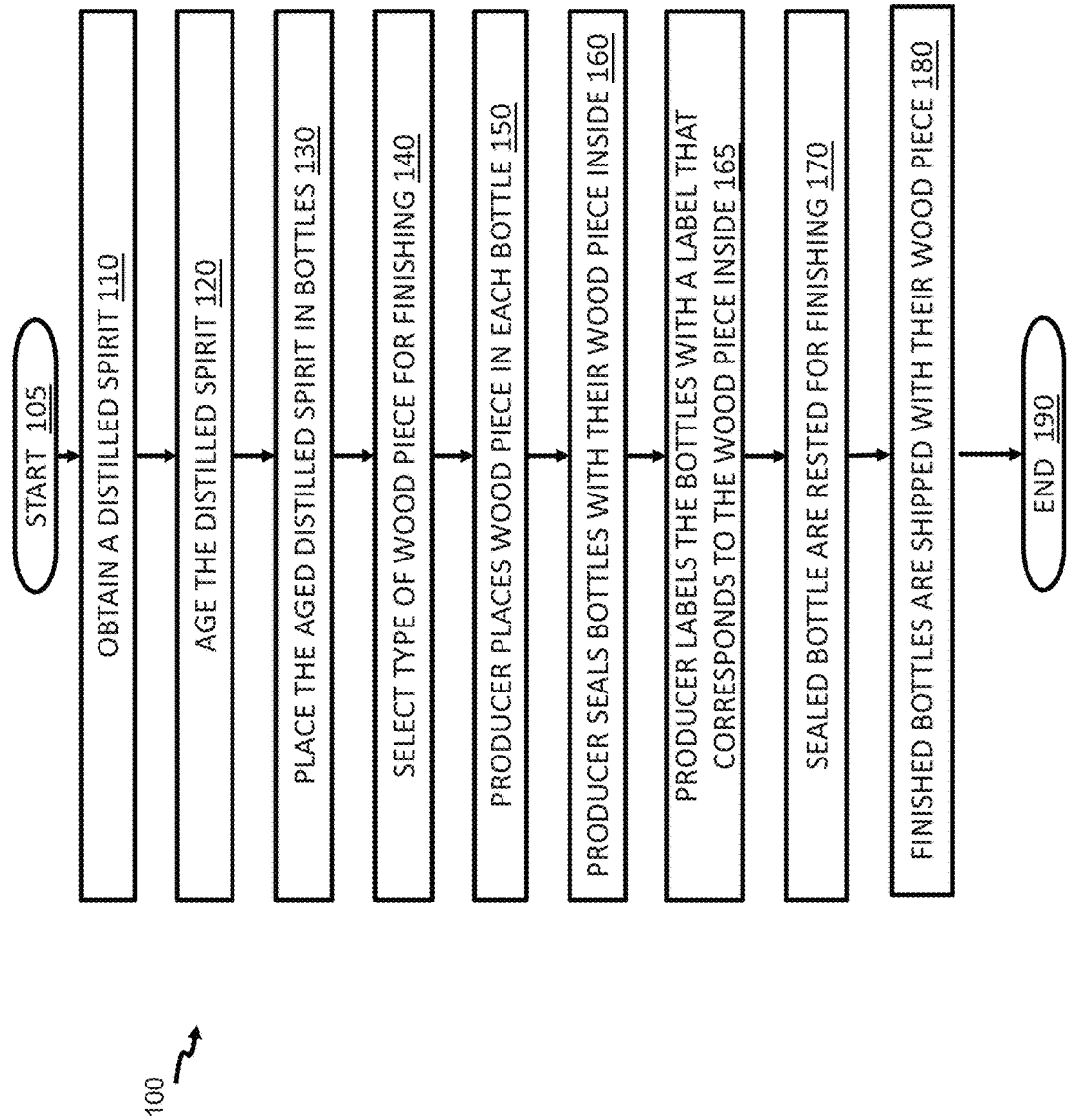

This application claims the benefit of U.S. Provisional Application Ser. No. 62/549,329, filed by Joseph Giildenzopf on Aug. 23, 2017, entitled "A METHOD OF PRODUCING A FINISHED, AGED DISTILLED SPIRIT," which is incorporated herein by reference in its entirety.

TECHNICAL FIELD

This application is directed, in general, to distilled spirits and, more specifically, to finishing a distilled spirit.

BACKGROUND

A distilled spirit, also referred to as a distilled beverage, liquor, hard liquor or hard alcohol, is an alcoholic beverage produced by distillation of fermented grains, fruit, or vegetables. Some distilled spirits, such as whiskey, bourbon, scotch, and rum, are aged after distillation. Aging is a process of storing the distilled spirits in wood barrels for an amount of time to add distinct flavors and remove harsh flavors from the raw alcohol. The wood barrels are typically constructed of toasted wood that interacts with the distilled spirit to contribute organic compounds and transforms acids into esters to give spirits their unique flavor.

The distilled spirit obtains distinct flavors from the different types of wood that are used for the barrels. In addition to distinct flavors, aging also adds color to the clear distilled spirits. The amount of time and the type of wood barrels can be specified for some distilled spirits. For example, all Scotch whisky must be aged in oak barrels for at least three years.

Once a distilled spirit is aged, it is typically removed from the wood barrel and bottled for distribution or later consumption. In contrast to wines, distilled spirits do not improve with age once placed in bottles. Instead, the maturation of the distilled spirit ends and the taste of the unopened whiskey, rum, etc. will not change while bottled and waiting on the shelf.

SUMMARY

One aspect provides a method of producing a finished, aged distilled spirit. In one embodiment, this method includes: (1) placing an aged distilled spirit in a bottle, (2) placing a wood piece in the bottle, wherein the wood piece is used for in-bottle finishing of the aged distilled spirit, and (3) sealing the bottle, having located within the bottle both the aged distilled spirit and the wood piece.

In another aspect the disclosure provides a method of producing bottles of a distilled spirit that employ in-bottle finishing. In one embodiment, this method includes: (1) placing a distilled spirit in bottles, (2) placing a wood piece in each of the bottles, wherein each of the wood pieces have a consistent structure and flavor profile, and is used for in-bottle finishing of the distilled spirit in each of the bottles, (3) capping and sealing the bottles, wherein the bottles include the distilled spirit and the wood piece, and (4) labeling the bottles with a label that identifies the flavor profile.

In yet another aspect, the disclosure provides an in-bottle finishing bottle of distilled spirit. In one embodiment, the in-bottle finishing bottle includes: (1) a bottle having an opening and containing a distilled spirit and a visible, wood spire in the distilled spirit, (2) a lid closing the opening, (3) a seal over the lid, and (4) a label, wherein the wood spire provides a finishing for the distilled spirit according to a flavor profile, and the label indicates the flavor profile.

BRIEF DESCRIPTION

Figure 2:
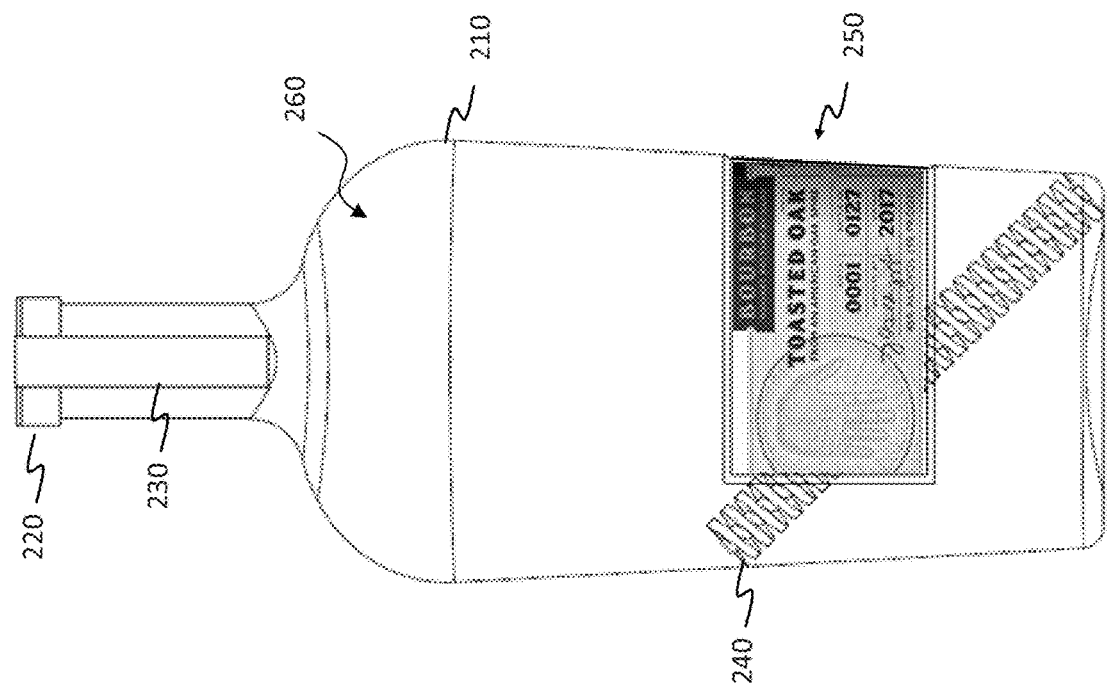

Reference is now made to the following descriptions taken in conjunction with the accompanying drawings, in which:

FIG. 1 illustrates a flow diagram of an embodiment of a method of producing a finished spirit; and FIG. 2 illustrates an embodiment of a bottle of a finished, aged, distilled spirit.

DETAILED DESCRIPTION

Before being bottled, an additional processing step is sometimes used to add additional flavor to aged distilled spirits. This step, referred to as finishing, is a technique whereby aged spirits are placed in a secondary barrel or cask for further maturation. The secondary cask has most likely been used previously to age another spirit, like rum, brandy, wine, or beer. A finished spirit is sometimes referred to as double matured since the spirit is matured in a first cask (aging) and then matured in another cask (a second cask for finishing) of a different origin.

By placing the aged spirit in a secondary cask the spirit takes on new, more nuanced flavors from the wood and other elements that are inherent to the secondary cask. This "finishes" the spirit and makes it unique (sanctified). Unfortunately, finishing requires more time in addition to the time used for aging. As such, the cost and time for finishing can outweigh the benefit of a finished spirit. This can have a chilling effect on the development and delivery of new products to the market.

The disclosure provides a method of producing a finished distilled spirit that reduces the amount of time compared to conventional finishing methods but still provides the benefit of a secondary cask. Instead of placing an aged distilled spirit in a secondary cask for finishing, the disclosed method includes placing an aged distilled spirit in a bottle and finishing the aged distilled spirit in the bottle. In addition to the aged distilled spirit, a wood piece is also placed in each of the bottles during manufacturing before the bottle is sealed for commercial sale and distribution. Sealing as used herein refers to capping and sealing a distilled spirit in a bottle (such as a glass bottle) for commercial sale. Sealing can be performed according to industry standards and via a conventional method including, but not limited to, cork type closures, capsules (including spinning and shrinking), and screw-on caps. Once sealed, the seal is broken and the lid is removed by the purchaser/consumer of the bottled spirit.

The wood piece is used for further maturation or finishing of the aged distilled spirit that is in the bottle. Thus, instead of in-cask finishing, the disclosed method advantageously employs in-bottle finishing. The wood piece is produced to increase the interaction of the wood with the distilled spirit in the bottle to reduce the amount of time for finishing compared to in-cask finishing. Since the in-bottle finishing is part of the manufacturing process of the distilled spirit, consistency of the wood pieces that are employed for finishing is needed. Accordingly, the wood pieces are produced according to certain parameters to produce a consistent finish across multiple bottles; including bottles having different volumes. In some embodiments, the wood pieces are selected to correspond to a particular finishing time. This also contributes to a consistent product for commercial sale.

The wood pieces can be cut to provide a high ratio of wood surface area to the distilled spirit in a bottle. In some embodiments, the wood piece is cut to provide an orientation of the wood grain to wood surface for an optimal wood-to-spirit in-bottle interaction. Accordingly, the surface area and grain orientation of the wood piece can be designed to reduce the finishing time. In some embodiments, the wood pieces are wood spires having a high surface area for chemical reaction with the distilled spirit. The design and production of the wood pieces allow the wood to impart desired chemical constituents into the bottled spirit while reacting and removing other chemical constituents (e.g., undesirable chemical constituents) from the bottled spirit in accordance with a known volume of the bottle and finishing time.

Turning now to the figures, FIG. 1 illustrates a flow diagram of an embodiment of a method 100 of producing a finished spirit. A finished spirit is a distilled spirit that has been aged and then finished. The method 100 provides sealed bottles of an aged distilled spirit that include a wood piece for finishing. The method 100 uniquely delivers reproducible flavor profiles to consumers employing in-bottle finishing. Each of the steps of the method 100 can be e performed by a manufacturer as part of the commercial distribution of the in-bottle finishing bottles. The method 100 begins in a step 105.

In a step 110, a distilled spirit is obtained. The distilled spirit can be obtained from a producer as an already distilled product or can be produced via, for example, conventional methods. The distilled spirit can be a whisky, rum, tequila, etc.

The distilled spirit is then aged in a step 120. The distilled spirit can be aged by traditional methods such as placing it within wooden barrels for a designated amount of time. The amount of time can vary depending on the type of distilled spirit, different methods used (aging at sea, high altitudes, chemically controlled processes, etc.) or desired results.

After aging, the aged distilled spirit is placed in bottles in a step 130. A conventional method of bottling according to the industry may be employed to place the aged distilled spirit in bottles. As such, the bottles can be filled with the aged distilled spirit according to industry standards. The bottles are the containers used for distributing the end product of the method 100. For example, the bottles in step 130 are the bottles that will later be sealed by the producer, distributed, and placed on shelves for purchase by the end users. Typically, the bottles are constructed of glass and have a sufficient opening to receive a wood piece as disclosed herein.

In a step 140, a particular type of wood piece is selected for placement in the bottles for finishing of the aged distilled spirit. The type of wood piece selected can correspond to a particular taste profile that is desired. Several different flavor factors can be selected to obtain a particular flavor profile. The taste profiles can vary by the type of wood of the wood piece and the amount of "toast or char" to which the wood is exposed. The types of wood include, but are not limited to, American oak, French oak, Cherry, Apple, Ash, and Mesquite. In some embodiments, the wood piece is cut from wood barrels that were previously used for aging of a distilled spirit or a wine.

Toast levels are typically used to represent the amount of toast for the wood piece and are the degrees of heat to which the wood is exposed. The heat applied to the wood or wood piece molecularly changes the wood, causing it to release certain botanicals that are inherent in the wood. In some embodiments, the different toast levels are Light toast, Medium toast, and Heavy toast. The toast levels can correspond to industry standards.

Charring is a chemical process of incomplete combustion of the wood when subjected to high heat. Char levels are the degrees to which the wood or wood piece is exposed to fire. Like toasting, charring wood causes the wood to release different botanicals and flavor essences. Different Char levels is the time or duration that the wood is exposed to fire. In one embodiment, the charring or Char levels that are used include Char 1, Char 2, and Char 3. The Char levels can correspond to industry standards.

A producer can mix and match the wood type, toast levels, and char levels to obtain different flavor profiles for the wood pieces. By employing standard toast and char levels, a producer can create and deliver reproducible flavor profiles to consumers employing in-bottle finishing. Employing a standard design, e.g., same dimensions and surface area, for the wood pieces also assists in delivering reproducible flavor profiles. For example, as noted above the wood pieces can be wood spires. To ensure the delivery of a consistent flavor profile the wood spires can be consistently cut a certain way. In some embodiments, the wood spires can be 5 inches in length (127 mm), ⅝ inches in diameter (15.875 mm), and cut in a spiral shape to expose more wood surface area.

The wood pieces can be cut to provide a desired ratio of the surface area to spirit volume within a bottle. Considering again a wood spire as an example, the surface area to volume ratio can be 467 mm$^2$ to 750 ml. Wood spires of different dimensions can be used for different sized bottles such that there is a consistent ratio of the wood surface area to the volume of spirits regardless the bottle size. In some embodiments, the surface area of the wood relative to the volume of spirit is precisely determined to perfectly finish the spirit "in-bottle" within a designated amount of time. Using a 750 ml bottle, the surface area to volume ratio can be the aforementioned 467 mm to 750 ml for an in-bottle finishing of six weeks.

In addition to the wood type, toast level, and char level, the wood pieces can also be rested in a different spirit to obtain specific flavor profiles. Before the spire is placed in the bottle of aged spirit, depending on the taste profile that is desired, the toasted or charred, wood spire may rest in a separate spirit, such as rum, brandy/wine or beer, to add yet another level of complexity to the final finished spirit. The amount of resting time can vary depending on empirical data for desired flavor profiles. At some point, absorption can be at least substantially reached where additional resting for a wood piece is not or only negligibly beneficial. In some embodiments, the amount of resting time for the wood pieces can be six weeks.

After selection of the wood piece, the type of selected wood piece is placed in each of the bottles by the producer in a step 150. The wood pieces can be placed in the bottles by hand. In some embodiments, multiple of a single type of the wood pieces can be placed in the bottles as long as a consistent reproducible finishing can be performed. For example, a known or desired surface area to volume ratio of wood to spirit can be maintained. A different type of wood piece can be placed in the bottles. For example, a French Oak wood piece can be placed in some bottles and a charred oak wood piece can be placed in other bottles. In some embodiments, different wood types of wood pieces can be place in a single bottle for a mixture of finishing woods. Additionally, multiple wood pieces of the same wood type can be placed in bottles.

In a step 160, the bottles having the aged distilled spirit and their wood piece, are sealed. The bottles can be sealed via conventional procedures typically employed in the alcohol beverage industry. The producer seals the bottles with the wood piece inside. Thus, the method 100 produces sealed bottles of distilled spirit having a wood piece designed/cut/manufactured for a selected flavor profile.

A label is added to the bottles in a step 165. The producer can attach labels to the bottles employing conventional methods known in the industry. Each of the labels can correspond to the type of wood piece that is used for the in-bottle finishing. For example, a bottle can include bourbon as the distilled spirit and a wood piece that is toasted American oak. Accordingly, the label can include bourbon and note a toasted oak finish from an American oak wood piece such as a spire. Thus, a consumer can know the type of in-bottle finishing that is used with each bottle when purchased.

The sealed bottles with their wood piece are then rested in a step 170 for a designated amount of time for finishing of the distilled spirit. The amount of time can be based on empirical data and usually corresponds to the exhaustion or substantial exhaustion of the wood piece within the bottle. The wood piece is exhausted when it has imparted all or substantially all of the flavor that it can or is intended to impart to the surrounding distilled spirit. Typically the designated amount of time for finishing is not changed to ensure consistent finishing through multiple batches of production. The time for the in-bottle finishing corresponds to the completion of the exchange of chemical constituents between the wood piece and the bottled spirit. As such, the in-bottle finishing process disclosed herein is a function of the wood piece (design, size, production, type, toast, char, etc.), liquid volume, and resting time. The values of the variables of the in-bottle finishing process can be changed to provide the contribution of organic compounds to transform acids into esters to give the bottled spirits the desired unique flavor. In some embodiments, a taste test is used to determine a desired product taste and the combination and values of the variables used to provide the desired product taste are selected for manufacturing and consistent reproduction of the product.

Considering the wood spired discussed above as an example, once the spire is placed in-bottle to finish the spirit, the bottle can be rested for six weeks before it is distributed or sold for consumption to allow sufficient time for the wood spire to enhance (sanctify) the spirit. As the finished product ages beyond six weeks, the flavor profiles typically will not change, but the product can become smoother and less harsh.

In a step 180, the finished bottles with wood piece are shipped. At this point, the producer has completed the production process and the finished, aged, distilled spirit is ready to be distributed and enjoyed by the consumer. The method 100 ends in a step 190. One skilled in the art will understand that at least some of the steps of the method 100 can be performed in a different order than disclosed herein. For example, bottles can be labeled before adding the aged distilled spirit and/or the wood piece.

FIG. 2 illustrates an embodiment of a bottle 200 of a finished, aged, distilled spirit. The bottle 200 includes a body 210, a lid or cap 220, a seal 230, a wood piece 240, a label 250, and distilled spirit 260 within a volume defined by the body 210. The bottle 200 is constructed of a non-permeable material. For example, the bottle 200 is made of a glass that is typically used for bottling liquor. The bottle 200 is of a distilled spirit, such as an aged distilled spirit, that employs in-bottle finishing and is ready for commercial sale. Thus, the bottle 200 is ready to be placed on shelves for purchase by consumers.

The body 210 defines the shape and volume of the bottle 200. The body 210 has an inner and outer surface. The body 210 is collectively representing the base, heel, shoulder, etc., and other known parts of a bottle.

The lid 220 is used to cover the orifice of the bottle 200. The lid 220 can be cork, a screw cap, or another type of lid that is conventionally used.

The seal 230 is used to secure the lid 220 and indicate no tampering from the producer to the consumer. Conventional types of seals can be used. As illustrated, the bottle 200 is capped and sealed after the wood piece 240 is placed in the bottle 200. Since the bottle 200 is for commercial sale, the seal 230 is unbroken.

The wood piece 240 is placed in the bottle 200 before the lid 220 and the seal 230 are placed thereon. The wood piece 240 can be a spire as illustrated. As disclosed herein, the wood piece 240 can be designed to correspond to the volume of the bottle 200 and a desired finishing time. When first placed in the bottle 200 with the distilled spirit 260, the wood piece 240 will float. The wood piece 240 absorbs the distilled spirit 260 during the process of exchanging chemical constituents with the distilled spirit 260 and sinks to the bottom of the bottle 200. In FIG. 2, the wood piece 240 is saturated with the distilled spirit 260 and has sunk to the base of the bottle 200. The type of wood piece 240 in FIG. 2 is toasted oak from an American oak as denoted by the label 250.

The label 250 corresponds to the type of wood piece 240 within the bottle 200. The label 250 can be attached to the bottle 200 via a conventional procedure. The body 210 can include an indentation area (not identified in FIG. 2) that corresponds to a shape and size of the label 250 and the label 250 can be placed within the indentation section. The bottle 200 with lid 220, seal 230, wood piece 240, label 250 and distilled spirit 260, can be shipped for commercial distribution and sale. According to the label 250, the distilled spirit 260 within the bottle 200 is bourbon. As noted herein, the disclosure covers other types of distilled spirits, such as brandy. Additionally, other types of spirits, such as wine or beer, may also be produced for commercial sale having a wood piece within a sealed bottle.

In one embodiment, the bottle 200 has a volume of 750 ml and the wood piece 240 has the dimensions of 5 inches in length (127 mm), ⅝ inches in diameter (15.875 mm), and cut in a spiral shape to expose more wood surface area and provide a surface area to volume ratio of 467 mm to 750 ml for an in-bottle finishing of six weeks. The wood pieces can be infusion spirals commercially available from, for example, The Barrel Mill in Central Minnesota.

Those skilled in the art to which this application relates will appreciate that other and further additions, deletions, substitutions and modifications may be made to the described embodiments. For example, in-bottle aging using a wood piece for commercial sale for spirits, including spirits that are not distilled, may also be used; different aging times and wood to volume ratio may be required. This disclosure can also apply to imparting a flavor from a wood piece or another type of flavor provider in a bottle, of other types of liquids, that is produced for commercial sale as provided herein.

What is claimed is:

1. A method of producing a finished, aged distilled spirit, comprising:
   placing an aged distilled spirit in a bottle;
   placing a wood piece in the bottle, wherein the wood piece is used for in-bottle finishing of the aged distilled spirit and is rested in a spirit that differs from the aged distilled spirit before the placing of the wood piece; and
   sealing the bottle, having located within the bottle both the aged distilled spirit and the wood piece.

2. The method as recited in claim 1 further comprising placing a label on the bottle, wherein the label corresponds to a flavor profile associated with the wood piece that is used for the in-bottle finishing.

3. The method as recited in claim 2 wherein the selected flavor profile is based on a type of wood, a toast level, and a char level.

4. The method as recited in claim 2, further comprising capping the bottle with a lid before the sealing and after the placing of the aged distilled spirit and the wood piece.

5. The method as recited in claim 4 further comprising shipping the bottle for commercial distribution after the sealing.

6. The method as recited in claim 1 further comprising resting the bottle after the sealing for a designated amount of time.

7. The method as recited in claim 6 wherein the designated amount of time corresponds to exhaustion of the wood piece within the bottle of the aged distilled spirit.

8. The method as recited in claim 1 wherein the wood piece is a spire.

9. The method as recited in claim 1 wherein the wood piece is a first wood piece and the method further comprises placing a second wood piece in the bottle.

10. The method as recited in claim 1 wherein the aged distilled spirit is bourbon.

11. The method as recited in claim 1 wherein the in-bottle finishing is a function of the wood piece, volume of the aged distilled spirit in the bottle, and a resting time of the bottle after the sealing.

12. The method as recited in claim 1 wherein the placing the aged distilled spirit, the placing the wood piece, and the sealing are performed for multiple bottles.

13. A method of producing bottles of a distilled spirit that employ in-bottle finishing, comprising:
   placing a distilled spirit in bottles;
   placing a wood piece in each of the bottles, wherein each of the wood pieces have a consistent structure and flavor profile, have been rested in a spirit that differs from the distilled spirit, and is used for in-bottle finishing of the distilled spirit in each of the bottles;
   capping and sealing the bottles, wherein the bottles include the distilled spirit and the wood piece; and
   labeling the bottles with a label that identifies the flavor profile.

14. The method as recited in claim 13 further comprising resting the bottle after the sealing for a designated amount of time that corresponds to exhaustion of the wood piece within the bottle of the distilled spirit.

15. The method as recited in claim 14 wherein the wood piece is a wood spire.

16. The method as recited in claim 15 wherein the distilled spirit is whiskey or bourbon.

17. The method as recited in claim 16 wherein each of the steps of the method are performed by a manufacturer for commercial distribution of the in-bottle finishing bottles.

18. The method as recited in claim 13 wherein the flavor profile is at least based on a type of wood, a toast level, and a char level.

* * * * *